T. C. DOBBINS.
SHOCK ABSORBING MECHANISM.
APPLICATION FILED APR. 26, 1920.

1,379,443.

Patented May 24, 1921.
2 SHEETS—SHEET 1.

Timothy C. Dobbins, Inventor

By *[signature]*
Attorney

T. C. DOBBINS.
SHOCK ABSORBING MECHANISM.
APPLICATION FILED APR. 26, 1920.
1,379,443.
Patented May 24, 1921.
2 SHEETS—SHEET 2.
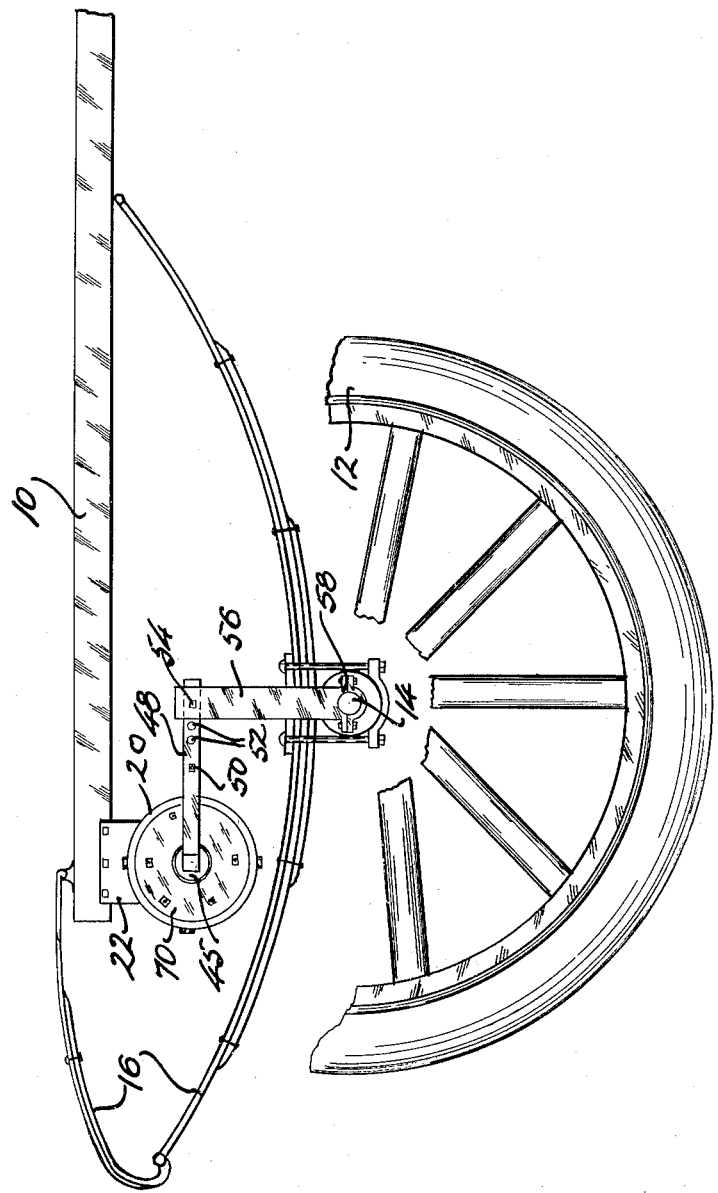
Fig. 4
Timothy C. Dobbins  Inventor
By 
Attorney

UNITED STATES PATENT OFFICE.

TIMOTHY C. DOBBINS, OF LOS ANGELES, CALIFORNIA, ASSIGNOR OF ONE-HALF TO DAVID H. ROBY, OF DENVER, COLORADO.

SHOCK-ABSORBING MECHANISM.

1,379,443.   Specification of Letters Patent.   Patented May 24, 1921.

Application filed April 26, 1920. Serial No. 376,511.

*To all whom it may concern:*

Be it known that I, TIMOTHY C. DOBBINS, a citizen of the United States, residing at the city and county of Los Angeles and State of California, have invented certain new and useful Improvements in Shock-Absorbing Mechanism; and I do declare the following to be a full, clear, and exact description of the invention, such as will enable others skilled in the art to which it appertains to make and use the same, reference being had to the accompanying drawings, and to the characters of reference marked thereon, which form a part of this specification.

The object of this invention is to provide a shock absorber for automobiles and the like which will be thoroughly practical and efficient in operation.

Briefly the invention comprises a shell member having a seat for a resilient member of considerable resistance, and an inner member having adjustable parts with shoes secured pivotally to their outer ends for engagement with said resilient member for compression thereof. One of said members is secured to the chassis and the other is provided with an arm connected with the axle of the vehicle. When the chassis moves down relatively to the axle, the tendency is to rotate one member relatively to the other whereby the shoes tend to sink into and compress the resilient part. In this manner the resilient part takes up the shock on the downward movement. In a similar way the rebound is absorbed.

In the drawings—

Fig. 4 is an elevation showing the device in use.

Figure 1:
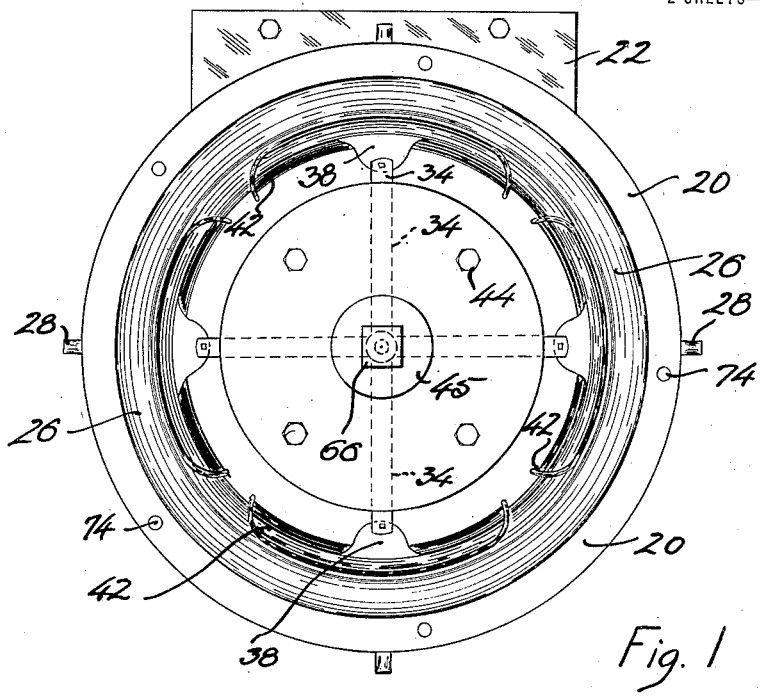
Figure 1 is an elevation of the device with the front plate removed.
Figure 2:
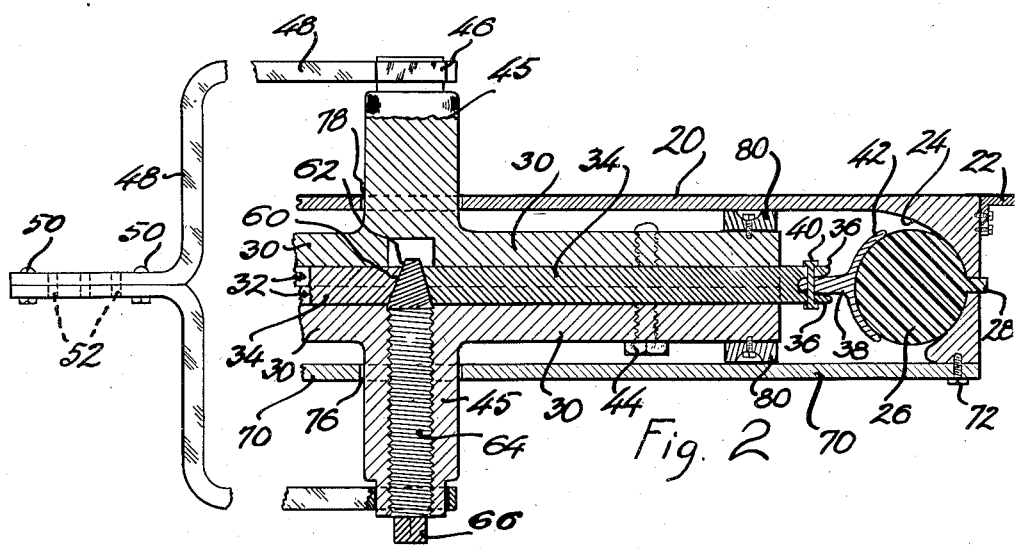
Fig. 2 is a fragmentary section showing the parts.
Figure 3:
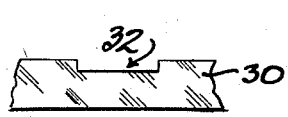
Fig. 3 is a detail.

The chassis 10 and wheel 12 of the automobile are provided with the usual axle 14 and springs 16. The absorber comprises an outer shell 20 adapted to receive inner parts and either the shell or said parts may be connected with the chassis and the other with the axle. In the drawings the shell is shown connected with the chassis by means of a bracket 22.

The inner wall of the periphery of the shell 20 is curved to provide a seat 24 which receives a resilient member 26, which is shown as an endless solid compressible rubber ring. The ring 26 has projections 28 on its periphery which extend through holes in the shell 20 and eliminate any tendency which the ring may have to slip within the shell, which is however very slight.

The inner mechanism comprises a pair of opposed plates 30 having opposed radial grooves 32 which receive adjustable radially disposed blocks 34 whose outer ends are provided with spaced ears 36 between which there is pivoted a tongue 38 as indicated at 40. Said tongue is mounted on a shoe 42, there being a shoe for each block 34, and the shoes 42 engage the rubber ring 26. The plates 30 are secured together by a series of bolts 44. Each plate is provided with a hub 45 whose outer end is squared as shown to receive the squared extremities 46 of parts 48 of a yoke, said parts being bolted together at 50 and provided with a series of eyes 52 for receiving a pivot pin 54 connecting said yoke to a standard 56 mounted on the axle 14 by means of a bearing 58.

The inner ends of the blocks 34 are beveled as at 60 and are engaged by the tapered end 62 of an adjusting screw 64 threaded into one of the hubs 45 and provided with a squared extremity 66 for engagement by a wrench when adjustment is made. The back of the shell 20 incloses one side of the device and a cover plate 70 is attached to the other side of the shell by means of screws 72 threaded into holes 74 in the shell. The plate 70 and the back of the shell are provided respectively with apertures 76 and 78 to receive the hubs 45. The plates 30 may have small spacing blocks 80 mounted thereon for maintaining the position of the plates 30 relative to the back of the shell 20 and the cover plate 70.

In using the device adjustment is first made by loosening the bolts 44 and screwing in the adjusting screw 64 to cause the tapered end 62 to engage the beveled ends 60 and force the blocks 34 outward to provide proper engagement of the shoes 42 with the resilient member 26. The bolts 44 are then tightened to cause the plates 30 to firmly clamp the blocks 34 between them, the grooves 32 opposing one another being slightly less in combined depth than the thickness of the respective block to permit the clamping function. The pivot pin 54 is then set in that aperture 52 of the yoke 48 which will give the proper amount of motion to the plates 30 for the desired shock absorbing qualities.

When the machine is in operation the plates 30 rotate with respect to the shell 20 in proportion to the amount of vertical movement of the chassis 10 with respect to axle 14. This causes the shoes 42, which frictionally engage the rubber ring 26, to tend to rotate, the result being that the ends of the shoes sink into the rubber ring and the relative rotation of the plates within the shell is gradually stopped. This takes up the shock. In like manner the rebound will be taken up.

I claim:

1. In combination a shell member, a member rotatable within the shell member, a resilient part in engagement with the shell member, shoes on the rotatable member engaging the resilient member, means for connecting one member with the body of a vehicle, and means for connecting the other member with an axle.

2. In combination in a shock absorber, a member having an engaging face therewithin, a resilient part engaging said face, a relatively rotatable member within said resilient part, and shoes pivotally mounted on said rotatable member and engaging said resilient part, means connecting one member with the body of a vehicle, and means for connecting the other member with an axle thereof.

3. In combination, a shell member having a bearing face therewithin, a member rotatable within said shell member, resilient means disposed between said members and in engagement with the shell member, shoes pivotally mounted on said rotatable member and engaging said resilient means, means for connecting one member with the body of a vehicle, and means for connecting the other member with an axle thereof.

4. In combination, a shell member having a bearing face therewithin, a member rotatable within said shell member, blocks movably mounted in said rotatable member, shoes pivotally mounted on the outer ends of said blocks, resilient means between said shell and shoes and engaging said bearing face and said shoes, said blocks being adjustable to adjust the position of said shoes, means for connecting one member with the body of a vehicle, and means for connecting the other member with an axle thereof.

5. In combination, a shell member having a bearing face therewithin, resilient means engaging said bearing face, a rotatable member within said shell member, blocks radially positioned on said rotatable member, shoes pivotally mounted on the outer ends of said blocks and engaging said resilient means, the inner ends of said blocks being tapered, and an axially mounted tapered pin adjustable axially to adjust the position of the blocks and the pressure of the shoes on the resilient means, means for connecting one member with a support and means for connecting another support with the other member.

In testimony whereof I affix my signature.

TIMOTHY C. DOBBINS.